United States Patent [19]
Webb et al.

[11] Patent Number: 5,800,796
[45] Date of Patent: Sep. 1, 1998

[54] COMPOSITE MEMBRANE AND USE THEREOF FOR SYNTHESIS OF HYDROGEN PEROXIDE

[75] Inventors: Steven P. Webb; James A. McIntyre, both of Midland, Mich.

[73] Assignee: The Dow Chemical Company, Midland, Mich.

[21] Appl. No.: 725,786

[22] Filed: Oct. 4, 1996

Related U.S. Application Data

[60] Provisional application No. 60/004,922, Oct. 6, 1995.

[51] Int. Cl.⁶ .................................................. C01B 15/01
[52] U.S. Cl. ........................... 423/584; 96/7; 96/11; 96/12; 428/457; 428/461; 428/500; 428/689
[58] Field of Search ........................... 422/211; 96/4, 96/7; 423/584

[56] References Cited

U.S. PATENT DOCUMENTS

| | | |
|---|---|---|
| 3,493,343 | 2/1970 | Logan et al. . |
| 3,578,609 | 5/1971 | Haag et al. . |
| 3,630,879 | 12/1971 | Spacil et al. . |
| 3,856,640 | 12/1974 | Halfar et al. . |
| 4,328,086 | 5/1982 | Takenaka et al. . |
| 4,330,633 | 5/1982 | Yoshisato et al. . |
| 4,364,803 | 12/1982 | Nidola et al. . |
| 4,384,931 | 5/1983 | Jasinski et al. . |
| 4,393,038 | 7/1983 | Sun et al. . |
| 4,416,801 | 11/1983 | Waller . |
| 4,455,203 | 6/1984 | Stucki . |
| 4,636,314 | 1/1987 | Beuhler et al. . |
| 4,687,755 | 8/1987 | Green . |
| 4,772,458 | 9/1988 | Gosser et al. . |
| 4,791,079 | 12/1988 | Hazbun . |
| 4,827,071 | 5/1989 | Hazbun . |
| 4,832,938 | 5/1989 | Gosser et al. . |
| 4,846,977 | 7/1989 | De Vellis et al. . |
| 4,908,114 | 3/1990 | Ayers . |
| 4,911,803 | 3/1990 | Kunz . |
| 5,055,171 | 10/1991 | Peck . |
| 5,132,099 | 7/1992 | Hiramatsu et al. . |
| 5,141,604 | 8/1992 | Ayers . |
| 5,210,059 | 5/1993 | Matturo et al. . |
| 5,211,827 | 5/1993 | Peck . |
| 5,211,984 | 5/1993 | Wilson . |
| 5,273,628 | 12/1993 | Liu et al. . |
| 5,306,411 | 4/1994 | Mazanec et al. . |
| 5,342,494 | 8/1994 | Shane et al. . |
| 5,512,263 | 4/1996 | McIntyre . |
| 5,534,471 | 7/1996 | Carolan et al. .................. 96/4 |

FOREIGN PATENT DOCUMENTS

0 415 448 A1  8/1990  European Pat. Off. .

OTHER PUBLICATIONS

Catalytic Palladium–Based Membrane Reactors: A Review J. Shu, et al. The Canadian Journal of Chemical Engineering, vol. 69, Oct. 1991, pp. 1036–1060.

Ion Exchange Membranes and Separation Process with Chemical Reactions Sata Journal of Applied Elecctrochemistry 21, 1991, pp. 283–294.
Paladium–Catalysed Synthesis of Hydrogen Peroxide from the Elements. 1. Conditions for the Formation of Hydrogen Peroxide Pospelova, et al., Russian Journal of Physical Chemistry, Feb. 1961, vol. 35, pp. 144–148.
Separation of Hydrogen Through Palladium Thin Film Supported on a Porous Glass Tube Uemiya, et al. Journal of Membrane Science, 556, 1991, pp. 303–313.
A Kinetic Study of the Catalytic Oxidation of Co Over Nafion–Supported Rhodium, Ruthenium, and Patinum Mattera, et al., American Chemical Society, 1986, pp. 4819–4824.
Perfluorinated Membranes as Catalyst Supports Hodges, et al. Applied Organmetallic Chemistry, 1990 vol. 4, pp. 465–473.
Polymeric Gas Separation Membranes Kesting, et al., ISBN 0–471–56931–3, pp. 19–59.
Chemicals with Power Langer, et al., Chemtech 226, 1985, p. 229.
Why Not Make Chemicals in Fuel Cells?, Spillman, et al., Chemtech 176, 1984, p. 182.
Direct Synthesis of Phenol Form Benzene During $O_2$–$H_2$ Fuel Cell Reactions Otsuka, et al., J. Electrochem, Cos. 2381 vol. 9, p. 139.
Perfluorinated Ionomer Membranes Sierke ACS Symposium Series No. 180, pp. 1982, 386–388.
Electrocatalysis of Hydrogen Appleby, et al Fuel Cell Handbook, 1989, 322–25.
One Step Synthesis of Hydrogen Peroxide Through Fuel Cell Reaction Otsuke, et al. Electrochim. vol. 35, No. 2, pp. 319–322, 1990.
Dissolution of Perfluorinated Ion Containing Polymers Martin et al. 54 Analytical Chemistry, 1639 (1982).
Putten et al., J. Chem. Soc. Commun. 477 (1986).
Cook et al. 137 (No. 6) J. Electrochem. Soc. 200 (Jun. 1990).
Chan et al., 105 J. Am. Chem. Soc. 3713–14 (1983).
Degrand, 169 J. Electroanal. Chem. 259–68 (1984).
U. S. Provisional Patent Application Ser. No. 60/021784, Entitled Reactor and Method for Synthesis of Hydrogen Peroxide (J. A, McIntyre, et al., Jul. 1996).

*Primary Examiner*—Wayne Langel
*Attorney, Agent, or Firm*—John B. Treangen

[57] ABSTRACT

This invention is a composite membrane for chemical synthesis, a chemical reactor into which the composite membrane might be incorporated, and a method of using the composite membrane. The composite membrane comprises a substrate, a first side, and a second side, wherein the substrate operatively connects the first side and second side, the first side comprises an oxidizing catalyst and the second side comprises a reducing catalyst. The reducing catalyst comprises, in elemental or combinative form, lanthanum, zinc, cerium, praeseodymium, neodymium, samarium, europium, gadolinium, terbium, dysprosium, holmium, erbium, thulium, ytterbium, lutetium, bismuth, or indium. A chemical reactor utilizing this composite membrane can react hydrogen and oxygen to form hydrogen peroxide without direct mixture of the reactants.

15 Claims, No Drawings

COMPOSITE MEMBRANE AND USE THEREOF FOR SYNTHESIS OF HYDROGEN PEROXIDE

This application claims the benefit of U.S. Provisional application Ser. No. 60/004,922 filed Oct. 6, 1995.

BACKGROUND AND SUMMARY OF THE INVENTION

This invention pertains to a composite membrane for chemical synthesis and a method for its use. Such composite membrane is particularly useful in the synthesis of hydrogen peroxide from hydrogen and oxygen.

The trend in commodities today is for materials which are "environmentally friendly". One such material is hydrogen peroxide. Hydrogen peroxide has many potential applications in, for example, chemical oxidation processes. One especially large field of use would be as a bleaching agent for paper. The demand for hydrogen peroxide is expected to grow at a rapid rate for many years. As such it would be advantageous to develop an efficient process for production of this commodity.

Most hydrogen peroxide ($H_2O_2$) is manufactured by a well known anthraquinone process. See, for example, Binran, 1 Appl. Chem., Ed. Chem. Soc. 302 (Japan 1986). Among the disadvantages of this process are that it requires the addition of numerous organic solvents, forms many unwanted by-products, and requires various separation steps. Another method for $H_2O_2$ preparation is cathodic reduction of oxygen in an alkali metal hydroxide solution. However this process requires input of significant amounts of electrical energy. Yet another method for forming hydrogen peroxide is by catalytic reaction of hydrogen and oxygen with supported or homogeneous platinum group metal catalysts suspended or dissolved in aqueous sulfonic and hydrochloric acid solutions. However, this method requires bringing hydrogen and oxygen into a dangerous, potentially explosive, mixture together at high pressures (for optimum performance, usually greater than 7000 kPa), constituting a serious safety hazard.

It would be desirable to have a reactor and method that eliminate the need for organic solvents, complex electrical equipment, and direct mixture of potentially explosive reactants. The invention disclosed herein seeks to eliminate many of the difficulties described above. It has been discovered that using a reactor cell design wherein reactants are controllably separated from each other by means of a catalytically optimized composite membrane provides an environment wherein relatively high pressures may be used without direct mixture of reactants such as hydrogen and oxygen. The reactor cell uses novel reducing catalysts and may be optimized for many types of reactions. In addition, since hydrogen and oxygen may be reacted directly in a single reactor, use of organic solvents is unnecessary.

In one aspect, this invention is a composite membrane for chemical synthesis comprising a substrate, a first side, and a second side, wherein the substrate operatively connects the first side and the second side, the first side comprises an oxidizing catalyst (for example, platinum), and the second side comprises a reducing catalyst which comprises, in elemental or combinative form, lanthanum, zinc, cerium, praeseodymium, neodymium, samarium, europium, gadolinium, terbium, dysprosium, holmium, erbium, thulium, ytterbium, lutetium, bismuth, or indium. This composite membrane may then be utilized in an appropriate reactor design. For example, an appropriate reactor design that may be utilized for hydrogen peroxide synthesis by safely reacting hydrogen and oxygen comprises:

(a) the aforementioned composite membrane wherein the first side is a hydrogen contact side and the second side is an oxygen contact side;

(b) a hydrogen supply chamber for placing hydrogen in contact with the hydrogen contact side of the composite membrane; and (c) an oxygen supply chamber for placing oxygen in contact with the oxygen contact side of the composite membrane.

The composite membrane is positioned between the hydrogen supply chamber and the oxygen supply chamber such that the hydrogen contact side operatively connects to, the hydrogen supply chamber and the oxygen contact side operatively connects to, the oxygen supply chamber. This type of chemical reactor may also be useful for conducting other synthesis reactions wherein similar conditions are desired.

DETAILED DESCRIPTION OF THE INVENTION

A composite membrane has now been discovered that provides a means for effective, room temperature, $H_2O_2$ synthesis by safely reacting $H_2$ and $O_2$ directly in a single reactor in the absence of organic solvents. By utilizing the reducing catalysts set forth herein, this composite membrane may also be effective in performing many other chemical synthesis reactions such as the following: oxidation of an alkene (for example, propylene) to an alkylene oxide (for example, propylene oxide); $H_2SO_4$ from $SO_2$, $H_2O$, and $O_2$ (see Langer et al., "Chemicals With Power," Chemtech 226, 229 (April 1985)); amine dyes from organo-nitro compounds (see Spillman et al., "Why Not Make Chemicals in Fuel Cells?," Chemtech 176, 182 (March 1984)); and phenol from benzene (see Otsuka et al., "Direct Synthesis of Phenol from Benzene during $O_2$—$H_2$ Fuel Cell Reactions," 139 [No. 9] J. Electrochem. Soc. 2381 (1992)). Synthesis of $H_2O_2$ is currently felt to be of significant importance and shall be discussed more specifically herein. However, in light of the following disclosure, one skilled in the art is capable of adapting the composite membrane of this invention to other reactions and the specific discussion of only $H_2O_2$ synthesis is not meant to limit the scope of this invention.

Specifically, a first aspect of this invention is a composite membrane comprising a substrate, a first side, and a second side, wherein the substrate operatively connects the first side and the second side, the first side of the composite membrane comprises an oxidizing catalyst and the second side of the composite membrane comprises a reducing catalyst. The catalysts may be either supported or unsupported and may be either discrete or non-discrete layers. A "discrete" layer, for purposes of this invention, is one which is attached, or adjacent, to the substrate and a "non-discrete" layer is one in which the catalyst is integrally mixed directly into the substrate.

The substrate may be any membrane which exhibits a sufficient ionic conductivity, preferably cationic conductivity, under the method of this invention. For hydrogen peroxide synthesis, however, it is further necessary that the substrate inhibit conductance of peroxyl anions. One skilled in the art is capable of determining effective substrates for performing this function. Generally, the substrate is a polymeric membrane. Typical polymeric membranes are also organic such as polymeric perfluorosulfonic acid (PFSA) or polycarboxylic acids. PFSA is an ion exchange membrane having negatively charged groups bound within the membrane. For a discussion of some commonly preferred PFSA polymers, and methods of preparing such polymers, see De Vellis et al., U.S. Pat. No. 4,846,977, col. 5, lines 1–36 (incorporated herein by reference). See also T. D. Sierke, "Perfluorinated Ionomer Membranes", ACS Symposium Series No. 180, pp. 386–88 (1982) (incorporated herein by reference). An example of a commercially available PFSA polymer is NAFION™ ( E. I. du Pont de Nemours and Company). Additional organic polymeric membranes may be materials such as sulfonated styrene grafts on a polytetrafluoroethylene backbone (for example, RAIPORE™ membranes, available from RAI Research Corporation) and crosslinked sulfonated copolymers of vinyl compounds (for example, TYPE CR™ membranes, available from Ionics, Inc.). While organic polymers are most common, inorganic polymers such as ceramic membranes, gels, siloxanes, and salt bridges are also possible.

The oxidizing catalyst may be any material which facilitates oxidation under conditions in which it is used. One skilled in the art is capable of determining effective oxidizing catalysts for performing oxidation in a desired reaction without undue experimentation. For example, in $H_2O_2$ synthesis, it is necessary for the first layer of the composite membrane to oxidize hydrogen to protons and electrons. Examples of catalysts useful for the first side in $H_2O_2$ synthesis include: platinum, palladium, gold, silver, mercury, iridium, ruthenium, ruthenium dioxide, nickel, nickel boride, sodium tungsten bronzes, tungsten trioxide, tungsten carbide, molybdenum sulfide, cobalt carbide, cobalt sulfide, cobalt molybdate, platinized boron carbide, copper phthalocyanine, palladium acetylacetonate, niobium, and mixed metal and spinel electrocatalysts. Further examples of potential oxidizing agents are generally discussed in Appleby et al., "Electrocatalysis of Hydrogen," Fuel Cell Handbook 322–35 (Van Nostrand Reinhold 1989), incorporated herein by reference. Preferred oxidizing catalysts for $H_2O_2$ synthesis include palladium, platinum, iridium, and combinations thereof.

The reducing catalyst on the second side of the composite membrane comprises, in elemental or combinative form, lanthanum, zinc, cerium, praeseodymium, neodymium, samarium, europium, gadolinium, terbium, dysprosium, holmiun erbium, thulium, ytterbium, lutetium, bismuth, or indium. By "combinative form", it is meant that the reducing catalysts can also include mixtures and compounds containing at least one of the above described elements. It should be understood that "oxides" is meant to include partial oxides wherein a "partial oxide" is a mixture of different stoichiometries of oxygen and metal such that the overall stoichiometry of the metal oxide is not a simple integer. Examples of reducing catalyst mixtures include: lanthanum-manganese, indium-tin oxide, praeseodymium-indium oxide, and lanthanide salts of polytungstic acid such as lanthanum phosphopolytungstate ($LaPW_{12}O_{40}$). Preferred reducing catalyst metals for $H_2O_2$ synthesis include gadolinium, zinc, lanthanum, mixtures thereof, and compounds thereof.

Methods for depositing metallized layers on, and incorporating into, substrates are well known in the art and a skilled artisan is capable of optimizing these deposition methods to form the composite membrane of this invention. Examples of such deposition methods are disclosed in Nidola et al., U.S. Pat. No. 4,364,803 (1982), Wilson, U.S. Pat. No. 5,211,984 (1993), and Takenaka et al., U.S. Pat. No. 4,328,086 (1982). The relevant teachings of both references are incorporated herein by reference. When using a discrete layer of catalyst, preferred embodiments of the present invention employ a layer thickness for the first and second sides of the composite membrane of no greater than 35 microns ($\mu$). Therefore, preferred catalyst particle size is also no greater than $35\mu$. More preferably, particle size is less than $10\mu$.

A second aspect of this invention is a reactor comprising the aforementioned composite membrane. The reactor includes a first reactant supply chamber for placing a first reactant in contact with the first side of the composite membrane and a second reactant supply chamber for placing a second reactant in contact with the second side of the composite membrane. The composite membrane is positioned between the first reactant supply chamber and the second reactant supply chamber such that the first side of the composite membrane operatively connects to, the first reactant supply chamber and the second side of the composite membrane operatively connects to, the second reactant supply chamber. Typically, the first reactant supply chamber faces the first side and the second reactant supply chamber faces the second side. With respect to the supply chamber and composite membrane, "operatively connects" means that the supply chambers are positioned such that relevant composition(s) contained therein can be placed in contact with appropriate sides of the composite membrane forming an interface between the relevant composition(s) and the appropriate sides. "Supply chamber" includes any vessel, space, zone, or the like, capable of substantially containing and facilitating contact between any relevant composition and an appropriate side of the composite membrane. In addition, each chamber desirably has at least one opening for supply and/or removal of relevant composition(s), reaction products, or both.

The first and second sides of the composite membrane are also operatively connected to each other. With respect to the "operative connection" of these sides to each other, the operative connection is such that both ions and electrons may be conducted from the first side to the second side. The electrons may be conducted either externally, internally, or both externally and internally. An example of an external electrical operative connection is the use of current collection plates in electrical contact on each side of the composite membrane and also in electrical contact with each other by wiring each plate through an external shorting bar. An example of an internal electrical operative connection is to have an intimate multiphase mixture of an electron conducting material with an ion conducting material wherein the electron conductive phase is internally dispersed throughout the ion conductive phase. "Internally dispersed" means that the phases, although independent and substantially continuous, are integrally intermixed such that the electron conductive phase is an interpenetrating network and not exclusively positioned external in relation to the ion conductive phase. This type of multiphase mixture is disclosed in copending U.S. patent application Ser. No. 08/239,017 (incorporated herein by reference).

The chemical reactor may further comprise a means for supplying the first reactant to the first reactant supply chamber and a means for supplying the second reactant to the second reactant supply chamber. Each of these means may be any conventional system or apparatus that transports relevant compositions from a source of the compositions into the respective chamber. For example, each means may be a pump and a conduit or passageway operatively connected to a source of the composition such that the relevant composition is pumped from its source, through the conduit, and into its respective chamber. The chemical reactor may further comprise a similar type of means to recover reaction products, such as hydrogen peroxide, from the reducing chamber.

In a preferred reactor, the first side of the composite membrane is a hydrogen contact side, the second side is an oxygen contact side, the first reactant supply chamber is a hydrogen supply chamber, and the second reactant supply chamber is an oxygen supply chamber. Therefore, in $H_2O_2$ synthesis, for example, the first side of the composite membrane oxidizes hydrogen to protons and electrons and the second side, in combination with the electrons produced at the first side, reduces oxygen to oxygen ions. When at least two electrons and cations have been provided to the oxygen contact side of the composite membrane, $H_2O_2$ is produced.

A third aspect of this invention is a method for using the reactor disclosed above. A preferred embodiment of this method is synthesis of hydrogen peroxide. However, synthesis of other compositions is possible using the reactor of this invention. Such synthesis methods will become clear to those of skill in the art in light of the following, specifically disclosed, method for synthesis of hydrogen peroxide. For synthesis of hydrogen peroxide, one step of the method comprises placing hydrogen in contact with the aforementioned hydrogen contact side of the composite membrane in the preferred reactor to produce at least one electron and at least one proton. For example, when the hydrogen is introduced in the form of $H_2$, the oxidizing catalyst (for example, Pt) promotes oxidation to two protons and two electrons. However, the hydrogen may be introduced in any form (for example, hydrogen containing mixture or compound) as long as the hydrogen contact side produces at least one electron and at least one proton. A desirable hydrogen containing mixture is hydrogen gas in admixture with water. The water helps to keep the composite membrane hydrated, thereby allowing good ionic conductivity.

A second step of the method comprises placing oxygen in contact with the oxygen contact side of the composite membrane. The oxygen may be placed in contact with the composite membrane as pure $O_2$, or as any oxygen containing mixture or compound. A desirable oxygen containing mixture is a mixture of air and water. Examples of means for placing either a hydrogen/water or oxygen/water mixture in contact with the composite membrane is to either bubble the hydrogen or oxygen through water before feeding the gas to the reactor, or to place the hydrogen or oxygen gas in contact with the composite membrane as a segmented flow with water. Generally, water helps dilute the hydrogen peroxide product, thereby reducing its potential decomposition. As with the hydrogen contact side, the water also helps to keep the composite membrane hydrated.

A third step of the method comprises conducting the at least one electron and the at least one proton produced at the hydrogen contact side of the composite membrane to an interface between the oxygen contact side of the composite membrane and the oxygen. The at least one electron and the at least one proton react with the oxygen in the presence of the reducing catalyst to form a reaction product, and when a total of two electrons and two protons are reacted with the oxygen, hydrogen peroxide is produced.

This method of chemical synthesis may, if desired, be conducted at an elevated temperature. Generally, the temperature should not exceed a temperature at which any one of the materials of the composite membrane, or any desired product, significantly decomposes or degrades. This temperature, and the significance of composite membrane degradation, vary according to the composition of the composite membrane. One skilled in the art is capable of determining both appropriate temperatures for conducting various synthesis reactions and whether decomposition is significant. In $H_2O_2$ synthesis, the method of this invention is preferably carried out in the reactor at a temperature greater than, or equal to, 2° C. Preferably, the temperature is also less than or equal to, 50° C., more preferably less than or equal to 30° C., and most preferably less than or equal to 10° C.

Furthermore, the hydrogen and oxygen feed streams are preferably placed in contact with the composite membrane at a pressure greater than, or equal to, 100 psi (689 kPa), more preferably greater than, or equal to, 500 psi (33447 kPa), and most preferably greater than, or equal to, 700 psi (4826 kPa).

Finally, it is preferable to remove any reaction products from the second side of the composite membrane. This isolates desirable reaction products and minimizes undesirable side reactions such as $H_2O_2$ decomposition.

EXAMPLES

The invention will be further clarified by a consideration of the following examples, which are intended to be purely exemplary of the use of the invention.

EXAMPLE 1

A 4 inch×4 inch (10.2×10.2 cm) square, 800 equivalent weight, 5 mil thick (127 micron) polymeric perfluorosulfonic acid (PFSA) membrane was converted to a sodium salt form by warming in caustic (1M NaOH) for 1 hour and rinsing repeatedly in deionized (DI) water to form the substrate. Oxidizing and reducing catalysts were independently applied to cover areas of 3.0×3.5 cm on each side of the substrate by a direct-paint-on (DPO) method. For the DPO method, two inks were made, one for each catalyst. Both inks were made by forming suspensions of a catalyst on carbon black with a propylene carbonate vehicle and an ionomeric binder. The oxidizing catalyst on carbon black (available from E-TEK, Inc.) was made by combining platinum and carbon black at 20 wt % Pt. The reducing catalyst on carbon black was made by combining zinc dust (available from Aldrich Chemical Company) and carbon black at 20 wt % Zn. The ionomeric binder consisted of a 5 wt % NAFION™ in mixed alcohols and water solution (available from E. I. du Pont de Nemours and Company) and it was added to each of the mixtures of catalyst on carbon black in an amount such that the total weight of the catalyst on carbon black was 2.5 times greater than the weight of PFSA in the PFSA/mixed alcohol/$H_2O$ binder. The propylene carbonate (available from Aldrich Chemical Company) was added to each of the inks in such an amount that the propylene carbonate was 2.5 times the total amount of catalyst on carbon black, by weight.

The reducing catalyst ink was painted onto the substrate in an amount sufficient to provide a 1.25 mg/cm$^2$ metal loading and the oxidizing catalyst ink was painted onto the opposite side of the substrate in an amount sufficient to provide a 0.3 mg/cm$^2$ metal loading. The inks were painted one at a time onto the substrate while the substrate was on a heated (50° C.), fritted vacuum table for 30 minutes. The table ensured that the substrate remained flat and aided in the evaporation of the propylene carbonate and binder solvents. Evaporation of the propylene carbonate vehicle and binder solvents formed a composite membrane having an oxidizing agent layer incorporated onto the hydrogen contact side and a reducing agent layer incorporated onto the oxygen contact side.

In order to protect the active catalysts on both sides of the composite membrane for the following hot pressing step, a 2.5"×2.5" (6.35×6.35 cm) sandwich was formed by placing on each side of the composite membrane the following (in order): a non-stick sheet of 2 mil (50.8 micron) thick KAPTON™ polyimide film; a glass-reinforced silicone rubber sheet; and a 1/16" (1.59 mm) thick polished, chrome-plated stainless steel plate. This composite membrane sandwich was pre-heated at 150° C. and minimal pressure (that is, the plates just touching each other) for 5 minutes and then hot pressed at 150° C. and 1380 kPa for five minutes. The hot pressed composite membrane was then removed from the press as the sandwich and cooled to room temperature. After cooling to room temperature, the composite membrane was removed from the sandwich and then reprotonated prom its sodium salt form to its proton form by immersing it in 1N $H_2SO_4$ for 30 minutes at room temperature. The reprotonated composite membrane had to then be re-flattened by putting it back on the heated (50° C.), fritted vacuum table for 30 minutes.

The reprotanated composite membrane was then operatively connected into a parallel-channel, flow-field, fuel cell reactor (available from Fuel Cell Technologies, Inc.) such that the oxidizing catalyst faced a hydrogen supply chamber of the reactor and the reducing catalyst faced an oxygen supply chamber of the reactor. Filling both chambers was a TEFLON™/carbon black impregnated carbon cloth diffuser (available from E-TEK, Inc., as ELAT™). The reactor was operated under shorted conditions on a fuel cell test stand (also available from Fuel Cell Technologies, Inc.). Operating pressures for the reactor were 45 psi (310 kPa) for the hydrogen contact side of the composite membrane and 60 psi (413 kPa) for the oxygen contact side. The reactor was operated at room temperature (25° C.) and the hydrogen gas feed stream was humidified by bubbling it through 50° C. water prior to entering the hydrogen supply chamber of the reactor. The oxygen gas feed stream was left dry. Collection of product was via a knock-out off of the exit of the oxygen supply chamber of the reactor. The reactor ran at approximately 1 Amp (100 mA/cm$^2$) and produced a 3.1 wt % peroxide solution.

Similar results were obtained when the same process as this example was duplicated with the exception that zinc oxide (ZnO) was deposited onto the carbon black, instead of the zinc dust. The ZnO was deposited from a Zn(OAc)$_2$ salt onto carbon black and calcined in air at 120° C. for one hour.

EXAMPLE 2

A composite membrane was produced as described above, however the reducing catalyst in the reducing catalyst ink was 20% gadolinium oxide on carbon black (weight ratio of Gd to Gd plus carbon weight) made from crystalline Gd(NO$_3$)$_3$·6H$_2$O (a water soluble salt of gadolinium available from Aldrich Chemical Company). The gadolinium on carbon black was made by, first, dissolving crystals of the gadolinium salt (0.72 g salt/g carbon) in a minimum amount of water. Second, carbon black was added to the salt solution to form a paste, as per a method of incipient wetness as known in the art. Next, the water was removed from the paste by heating the paste gently while grinding in a mortar and pestle. The resulting Gd+3/carbon powder was then placed into a convection oven and maintained at a temperature of 120° C. for 30 minutes to form the reducing catalyst on carbon black.

The resulting reducing catalyst ink (including the propylene carbonate vehicle and an ionomeric binder, as in Example 1) was painted onto the substrate in an amount sufficient to provide a 0.31 mg/cm$^2$ metal loading and the oxidizing catalyst ink (20% Pt on carbon and including the propylene carbonate vehicle and an ionomeric binder) was painted onto the opposite side of the substrate in an amount sufficient to provide a 0.30 mg/cm$^2$ metal loading. In contrast to Example 1, the resulting composite membrane was left in its sodium salt form after hot-pressing.

The composite membrane was run in the same fuel cell reactor (as in Example 1), however the reactor was operated on a high pressure fuel cell test stand which was capable of operating at a pressure up to 900 psi. Similarly to above, the hydrogen supply chamber was filled with ELAT™, however the oxygen supply chamber was filled with a 3 mil (76.2 micron) thick, untreated carbon paper (available from Spectrocarb, Corp.). The inlet pressure of the hydrogen gas which was contacted with the oxidizing catalyst on the hydrogen contact side of the composite membrane was 4830 kPa (700 psi) and that of the oxygen gas which was contacted with the reducing catalyst on the oxygen contact side of the composite membrane was also 4830 kPa. The oxygen gas was fed to the reducing catalyst as a segmented flow of O$_2$ with deionized (DI) water, the water being added to the gas at a rate of 0.2 mL/min. The reactor was operated at room temperature with continuous gas feed for a period of 14 minutes. A reaction product was formed and combined with the added water to produce a concentration of 3.0 wt % hydrogen peroxide.

By measuring electrical current passing through this set up via the voltage difference across a calibrated shorting bar, it was determined that one electron passed through the set up for each hydrogen atom that was consumed to form product (water or peroxide). A weight determination of the total product formed was 2.87 grams. Together these measurements allowed for a calculation of the selectivity of the reaction in terms of moles of peroxide formed per mole of hydrogen. For this example, 0.95 amps were generated (passed) from the hydrogen contact side to the oxygen contact side over the 14 minute test, corresponding to a hydrogen selectivity for hydrogen peroxide of 62 mole percent. Calculated maximum hydrogen peroxide would be 0.14 g at 100% conversion efficiency for this current and time.

When this same composite membrane was operated with an external water flow of 0.05 mL/min., 4.1 wt % hydrogen peroxide was generated at a hydrogen selectivity of 44 mole percent.

EXAMPLE 3

Identical procedures were followed as described above in Example 2 except for the following: (1) lanthanum nitrate was used (same work up as the Gd nitrate) for the oxygen reducing catalyst; and (2) after the hot pressing step, the composite membrane was reprotonated from its sodium salt form to its proton form by first cooling to room temperature, then immersing in 1N H$_2$SO$_4$ for 30 minutes at room temperature. The reprotonated composite membrane had to then be reflattened by putting it back on the heated (50° C.), fritted vacuum table for 30 minutes.

While conducting the synthesis reaction with this composite membrane, the flow of water to the reactor was 0.2 mL/min. and the resulting product stream was 1.3 wt % hydrogen peroxide with a hydrogen selectivity for hydrogen peroxide of 70 mole percent.

EXAMPLE 4

Identical procedures were followed as described in Example 3 with the exception that lanthanum phosphopolytungstate (LaPW$_{12}$O$_{40}$) was used instead of lanthanum nitrate. While conducting the synthesis reaction with this composite membrane, the flow of water to the reactor was 0.8 mL/min. and the collected product was 1.1 wt % hydrogen peroxide with a hydrogen selectivity for hydrogen peroxide of 72 mole percent.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A method for synthesis of hydrogen peroxide using a composite membrane having a substrate, a hydrogen contact side, and an oxygen contact side, wherein the method comprises:

(a) placing hydrogen in contact with the hydrogen contact side of the composite membrane to produce at least one electron and at least one proton;

(b) placing oxygen in contact with the oxygen contact side of the composite membrane; and (c) conducting the at least one electron and the at least one proton produced in step (a) to an interface between the oxygen contact side of the composite membrane and the oxygen such that the at least one electron and the at least one proton react with the oxygen to form a reaction product comprising hydrogen peroxide wherein the substrate operatively connects the hydrogen contact side and the oxygen contact side, the hydrogen contact side comprises an oxidizing catalyst, and the oxygen contact side comprises a reducing catalyst which comprises, in elemental or combinative form, lanthanum, zinc, cerium, praeseodymium, neodymium, samarium, europium, gadolinium, terbium, dysprosium, holmium, erbium, thulium, ytterbium, lutetium, bismuth, or indium.

2. The method of claim 1 wherein the hydrogen in step (a) is provided as a hydrogen containing mixture.

3. The method of claim 2 wherein the hydrogen containing mixture comprises hydrogen and water.

4. The method of claim 1 wherein the hydrogen in step (a) is provided as a hydrogen containing compound.

5. The method of claim 1 wherein the oxygen in step (b) is provided as an oxygen containing mixture.

6. The method of claim 5 wherein the oxygen containing mixture comprises oxygen and water.

7. The method of claim 1 wherein the reactor is maintained at a temperature of from 2° C. to 30° C.

8. The method of claim 1 wherein the hydrogen and oxygen are placed in contact with the composite membrane at a pressure of greater than 100 psi (689 kPa).

9. The method of claim 1 wherein the reducing catalyst comprises, in elemental or combinative form, gadolinium, zinc, or lanthanum.

10. The method of claim 1 wherein the reducing catalyst is an oxide.

11. The method of claim 1 wherein the reducing catalyst is lanthanum phosphopolytungstate.

12. The method of claim 1 wherein the oxidizing catalyst comprises, in elemental or combinative form, palladium, platinum, or iridium.

13. The method of claim 1 wherein the substrate is a polymeric-based membrane.

14. The method of claim 13 wherein the polymeric-based membrane is organic.

15. The method of claim 14 wherein the organic, polymeric-based membrane comprises a polymeric perfluorosulfonic acid.

* * * * *